(12) United States Patent
Reed et al.

(10) Patent No.: US 11,752,573 B2
(45) Date of Patent: Sep. 12, 2023

(54) LASER CLEARANCE OF COATING

(71) Applicant: United Technologies Corporation, Farmington, CT (US)

(72) Inventors: Gordon M. Reed, Plantsville, CT (US); David N. Potter, East Hampton, CT (US)

(73) Assignee: RTX Corporation, Farmington, CT (US)

( * ) Notice: Subject to any disclaimer, the term of this patent is extended or adjusted under 35 U.S.C. 154(b) by 671 days.

(21) Appl. No.: 15/670,330

(22) Filed: Aug. 7, 2017

(65) Prior Publication Data

US 2019/0039177 A1 Feb. 7, 2019

(51) Int. Cl.
| | |
|---|---|
| F01D 5/08 | (2006.01) |
| B23K 26/06 | (2014.01) |
| B23K 26/03 | (2006.01) |
| B23K 26/282 | (2014.01) |
| B23K 26/382 | (2014.01) |
| B23K 26/40 | (2014.01) |
| F01D 5/28 | (2006.01) |
| F01D 5/18 | (2006.01) |

(52) U.S. Cl.
CPC ........ B23K 26/0648 (2013.01); B23K 26/032 (2013.01); B23K 26/282 (2015.10); B23K 26/389 (2015.10); B23K 26/40 (2013.01); F01D 5/186 (2013.01); F01D 5/288 (2013.01); *F05D 2230/80* (2013.01)

(58) Field of Classification Search
CPC .. B23K 26/0648; B23K 26/282; B23K 26/40; F05D 2260/202
See application file for complete search history.

(56) References Cited

U.S. PATENT DOCUMENTS

| | | | |
|---|---|---|---|
| 6,172,331 B1 | 1/2001 | Chen | |
| 6,383,602 B1* | 5/2002 | Fric | F01D 5/186 |
| | | | 427/454 |
| 7,329,832 B2 | 2/2008 | Hoebel et al. | |
| 7,725,210 B2* | 5/2010 | Hoebel | F01D 5/005 |
| | | | 700/166 |
| 8,237,082 B2 | 8/2012 | Beck et al. | |
| 9,029,729 B2 | 5/2015 | Massa et al. | |
| 2008/0085395 A1 | 4/2008 | Fernihough et al. | |
| 2009/0142548 A1* | 6/2009 | Patterson | C23C 28/3215 |
| | | | 428/137 |

(Continued)

OTHER PUBLICATIONS

EP search report for EP18187595.6 dated Dec. 19, 2018.

*Primary Examiner* — Helena Kosanovic
*Assistant Examiner* — Ahmad Abdel-Rahman
(74) *Attorney, Agent, or Firm* — GETZ BALICH LLC (57) ABSTRACT

Aspects of the disclosure are directed to processing a component. A first coating is removed from a substrate of the component, the substrate including a first hole. Subsequent to removing the first coating from the substrate, a second coating is applied to the substrate, where a portion of the second coating at least partially blocks the first hole. Subsequent to applying the second coating to the substrate, the portion of the second coating is removed to generate a second hole through the second coating. The removal of the portion of the second coating creates a bore in the second coating that provides a clearance from an edge of the first hole on a surface of the substrate that interfaces to the second coating.

18 Claims, 10 Drawing Sheets

(56) References Cited

U.S. PATENT DOCUMENTS

| | | |
|---|---|---|
| 2011/0076405 A1 | 3/2011 | Raji et al. |
| 2012/0167389 A1* | 7/2012 | Lacy .................. F01D 5/186 |
| | | 29/889.1 |
| 2013/0209228 A1* | 8/2013 | Xu ..................... F01D 9/065 |
| | | 415/115 |
| 2013/0268107 A1 | 10/2013 | Bostanjoglo et al. |
| 2015/0369059 A1 | 12/2015 | Burd et al. |
| 2016/0243655 A1* | 8/2016 | Hu ..................... F01D 5/288 |

* cited by examiner

LASER CLEARANCE OF COATING

BACKGROUND

Gas turbine engines, such as those which power aircraft and industrial equipment, employ a compressor to compress air that is drawn into the engine and a turbine to capture energy associated with the combustion of a fuel-air mixture. Some gas turbine engine components include cooling holes in order to reduce the temperature of the component during use/operation. For example, film cooling holes may be used to form a protective thin film of cool air along an outer/exterior surface of a component. Also, one or more protective coatings may be applied to a substrate/base metal of the component to further shield the component from the elevated temperatures in the engine.

Figure 2:
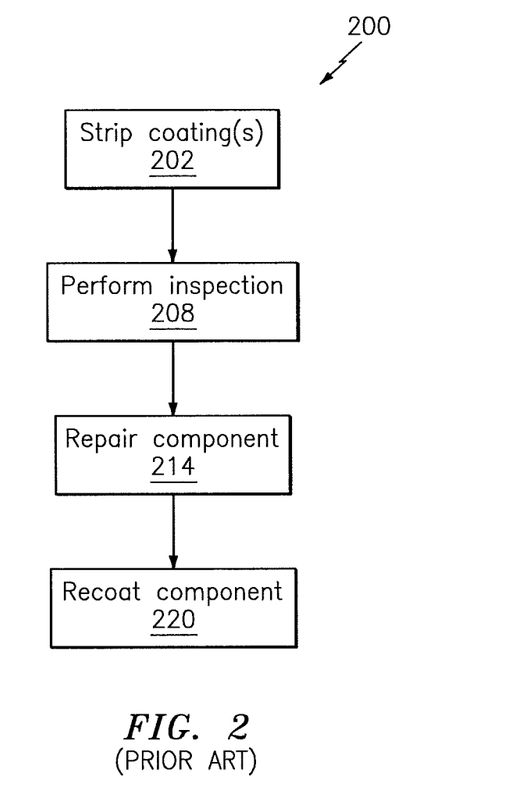
FIG. 2 illustrates a flow chart of a method for processing a component in accordance with the prior art.

Generally, film cooling holes are machined into the component following the application of the coating(s) to provide for a clean/uniform hole through both the coating(s) and the substrate. Referring to FIG. 2 (which illustrates a flow chart of a method 200 for processing a component in accordance with the prior art). During engine maintenance procedures the coating(s) are stripped (block 202), inspections are performed (block 208), repairs are provided to the component (e.g., the substrate) as needed (block 214), and then the component is recoated (block 220). The recoating of the component will often compromise the air flow through the existing holes, reducing the benefit of the cooling that is provided by those holes. For example, the recoating may block/obstruct some or all of a hole, thereby impeding or preventing flow of air through the hole.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method for processing a component, comprising: removing a first coating from a substrate of the component, the substrate including a first hole, subsequent to removing the first coating from the substrate, applying a second coating to the substrate, where a portion of the second coating at least partially blocks the first hole, and subsequent to applying the second coating to the substrate, removing the portion of the second coating to generate a second hole through the second coating, where the removal of the portion of the second coating creates a bore in the second coating that provides a clearance from an edge of the first hole on a surface of the substrate that interfaces to the second coating. In some embodiments, the bore has a first thickness and the second coating has a second thickness. In some embodiments, the first thickness is substantially equal to the second thickness. In some embodiments, the first hole has a first dimension, and the bore has a second dimension. In some embodiments, the second dimension is a value within a range of 50-100% of the first dimension. In some embodiments, the first dimension is a diameter of the first hole, and the second dimension is a width of the bore. In some embodiments, the method further comprises identifying a location of the first hole. In some embodiments, the location of the first hole is identified subsequent to the removal of the first coating from the substrate and prior to the application of the second coating to the substrate. In some embodiments, the method further comprises using a laser to remove the portion of the second coating from the substrate. In some embodiments, the method further comprises controlling, during the removing, at least one parameter of the laser based on an identification of the laser. In some embodiments, the at least one parameter includes at least one of: a total number of laser pulses, laser power, pulse width, or spot size. In some embodiments, the component is an exhaust nozzle of an engine. In some embodiments, the component is part of an engine, and the component is one of a vane, a blade, a flap, a case, or a liner. In some embodiments, the first coating is removed from the substrate using a water-jet.

Aspects of the disclosure are directed to an exhaust nozzle of an engine, comprising: a substrate having a first hole, and a coating having a second hole, the coating coupled to the substrate, where a portion of the substrate that is adjacent to the first hole is free of the coating to form a bore in the coating about the second hole. In some embodiments, the bore includes a width that is a value within a range of 50-100% of a diameter of the first hole.

Aspects of the disclosure are directed to a system comprising: a component that includes a coating coupled to a substrate, the substrate including a first hole, a laser, a processor, and a non-transitory storage device that includes instructions that, when executed by the processor, cause the processor to: cause the laser to remove a portion of the coating to generate a second hole in the coating, where the first hole and the second hole are substantially arranged about an axis, and where a portion of the substrate that is adjacent to the first hole is free of coating to form a bore in the coating about the second hole. In some embodiments, the bore includes a width that is a value within a range of 50-100% of a diameter of the first hole. In some embodiments, the bore is a counterbore. In some embodiments, the coating is a thermal barrier coating that includes a ceramic material, and the substrate is a metal material

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Figure 1:
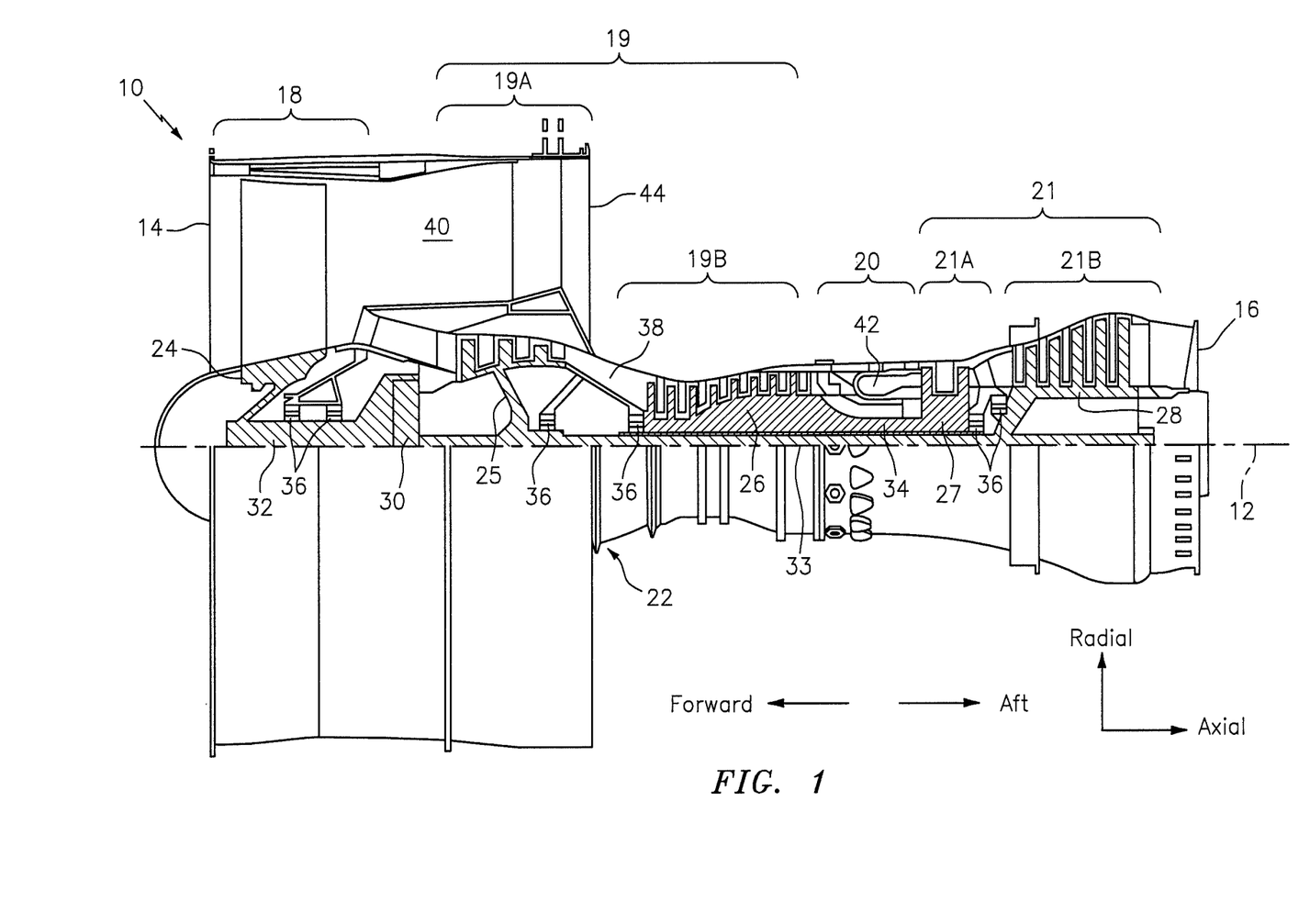
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at, a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3A:
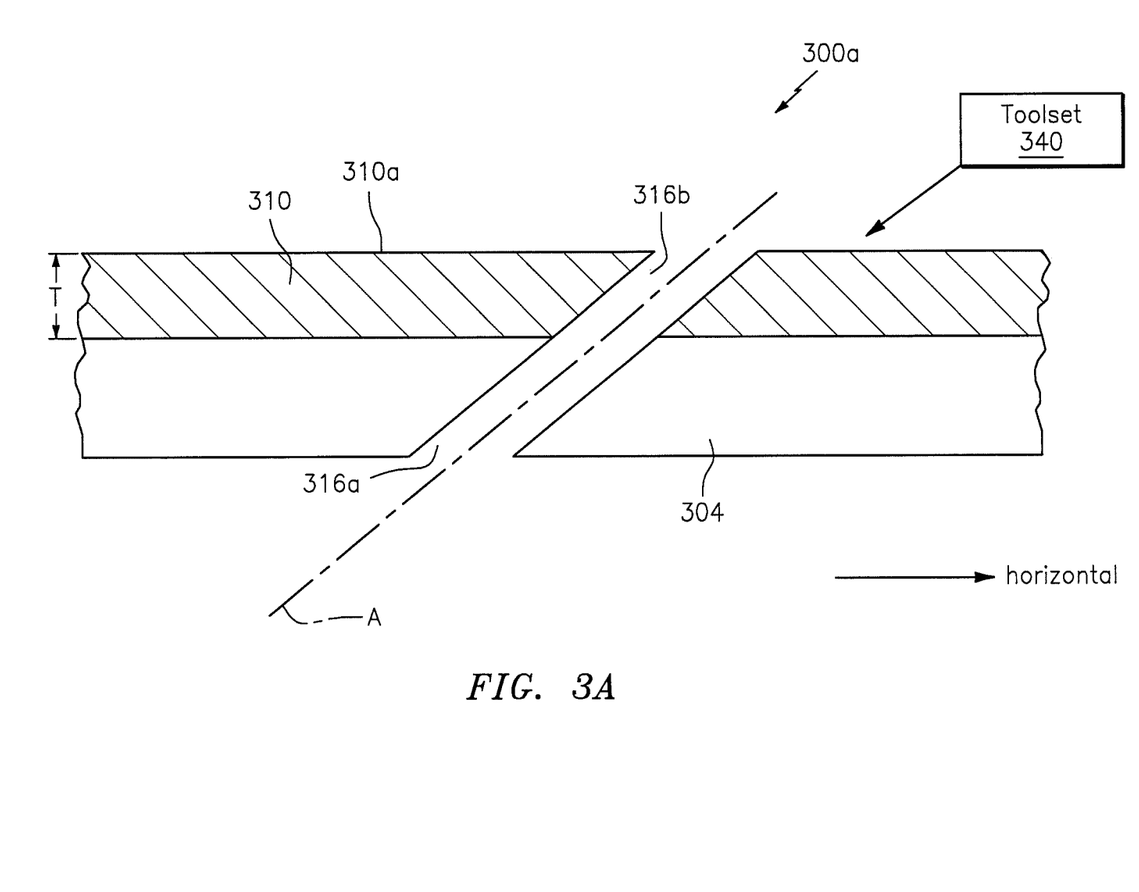
FIGS. 3A-3D illustrate a component at various stages of processing in accordance with aspects of this disclosure.

As described above, an engine may include one or more structures. For example, the exhaust 16 may include one or more nozzles that may be used to control/regulate characteristics associated with the engine's operation, such as for example a noise profile, a temperature profile, a pressure profile, etc. Referring to FIG. 3A, a schematic depiction of a nozzle 300a is shown. The nozzle 300a may include a substrate 304. In some embodiments, the substrate 304 may include a metal, such as for example a nickel, steel, aluminum, etc. One or more coatings (represented by coating 310) may be applied/coupled to the substrate 304. The coatings 310 may include one or more materials, such as for example a ceramic material (e.g., yttria stabilized zirconia) or a metallic material (e.g., MCrAlY, where M is frequently at least one of iron, cobalt, or nickel, and X is an active element and stands for at least one of yttrium, silicon, a rare earth element, or hafnium).

A first hole 316a may be formed through the substrate 304. A second hole 316b may be formed through the coating 310. The holes 316a and 316b may be arranged about an axis 'A', e.g., the holes 316a and 316b may be co-axial. The holes 316a and 316b may be used to cool the nozzle 300a. For example, during engine operation the holes 316a and 316b may provide a thin film of cooling air on an exterior/outer surface 310a of the coating 310.

The holes 316a and 316b are shown in FIG. 3A as being oriented at an angle relative to the substrate 304 and the coating 310. For example, the holes 316a and 316b are shown in FIG. 3A as being oriented at an angle of approximately forty-five degrees relative to the superimposed horizontal reference direction. A particular value for an angle (e.g., thirty degrees) that is used for the holes 316a and 316b may be based on one or more parameters of the nozzle 300a, such as for example a specification associated with the substrate 304 or the coating 310. Similarly, a size or dimension of the holes 316a and 316b may be based on one or more parameters of the nozzle 300a. While the holes 316a and 316b are shown as being substantially cylindrical, other shapes/form-factors for the holes 316a and 316b may be used.

The nozzle 300a shown in FIG. 3A may be indicative of an original equipment manufacture (OEM), and the holes 316a and 316b may be formed in the nozzle 300a following the application of the coating 310 to the substrate 304. During engine maintenance procedures, the nozzle 300a may be subject to further processing/reconditioning as described below.

Figure 3B:
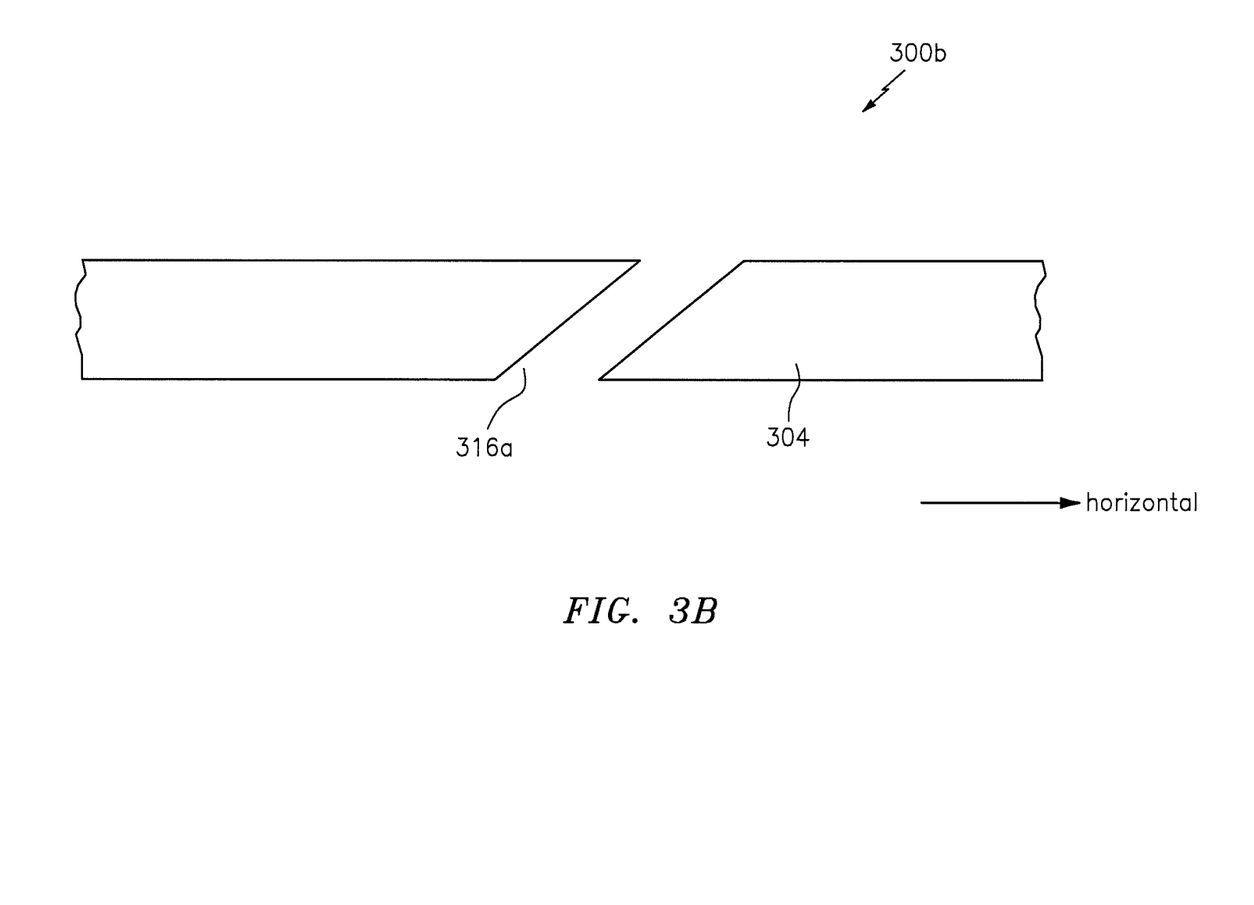
Figure 3C:
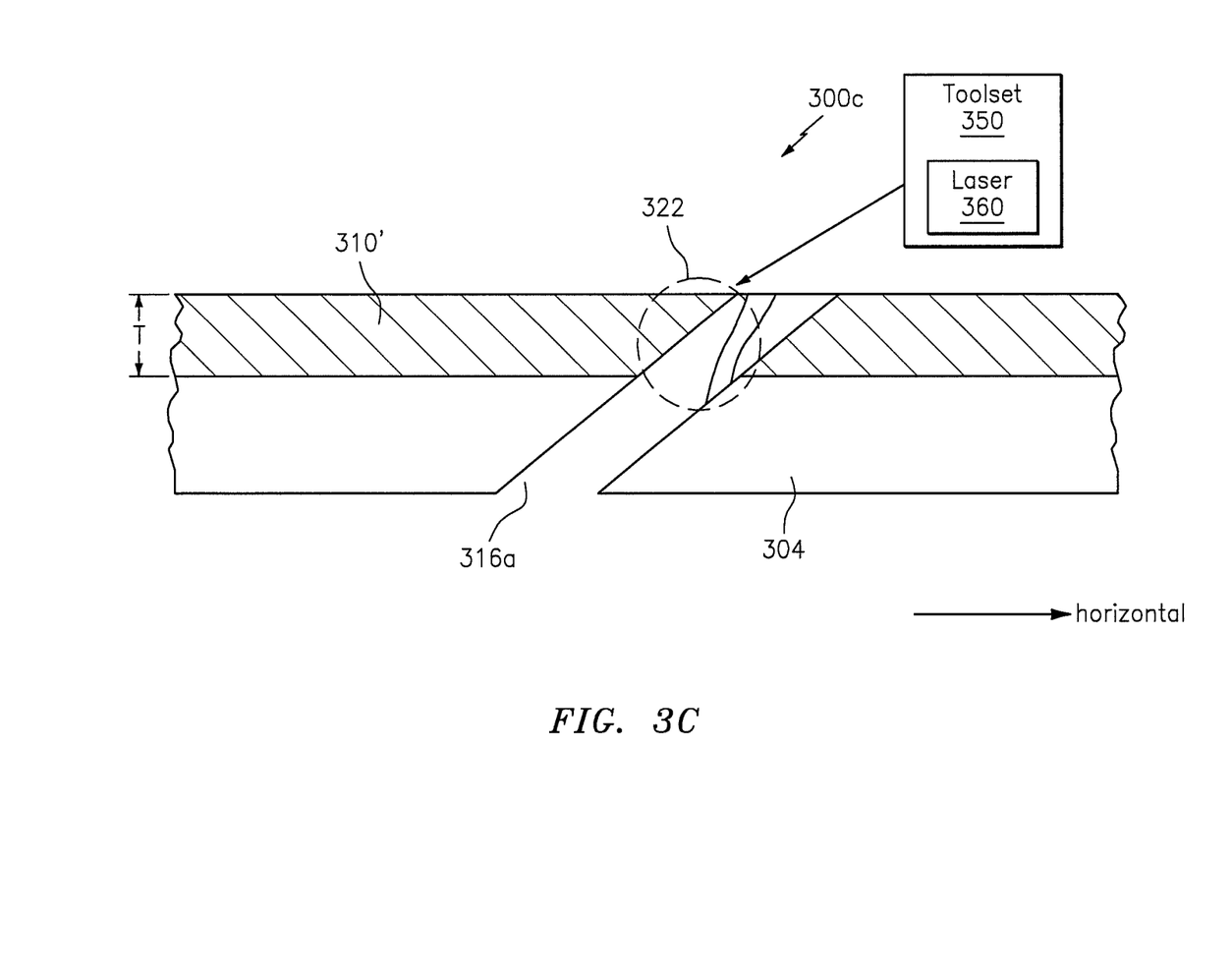
Figure 3D:
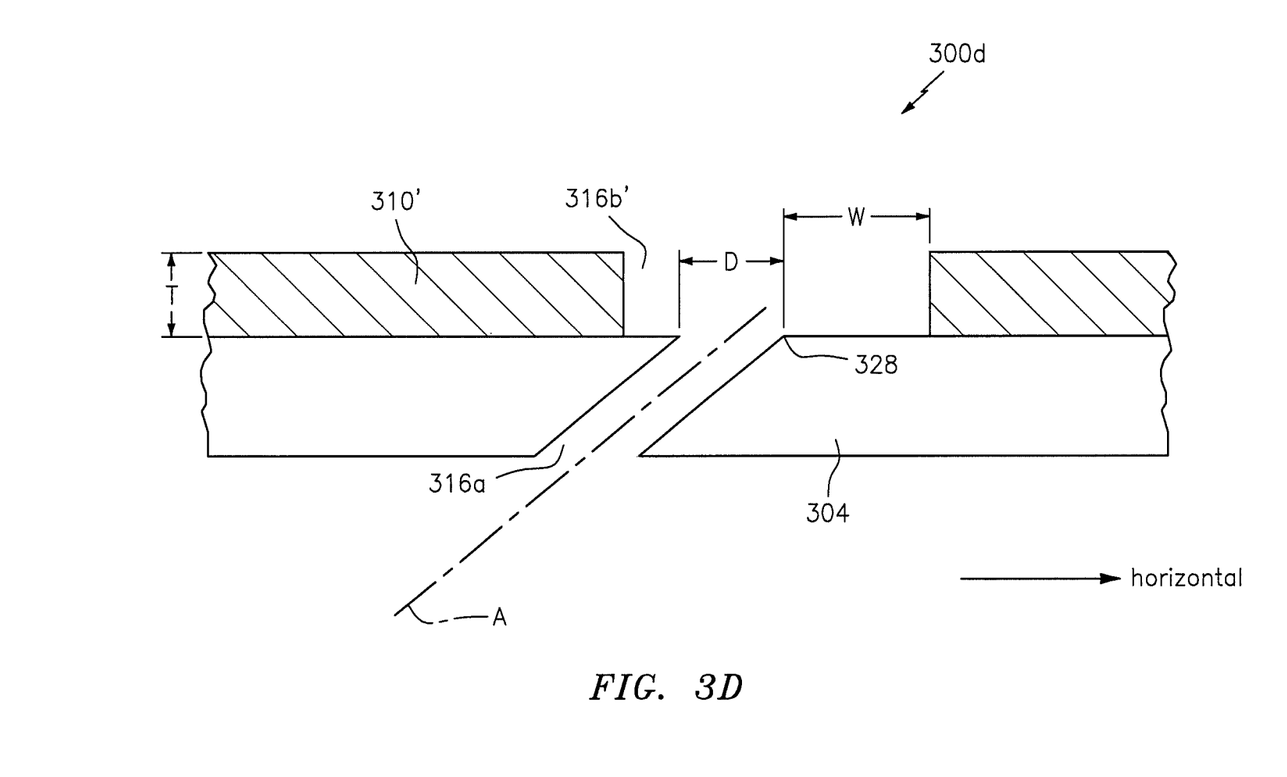
Figure 4:
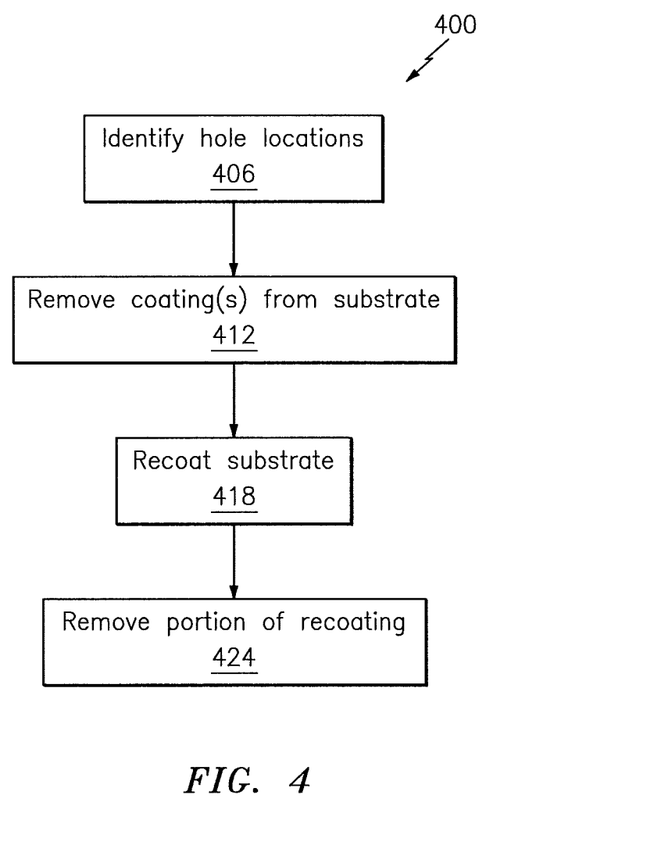
FIG. 4 illustrates a flow chart of a method for processing a component in accordance with aspects of this disclosure.

Referring to FIG. 4, a method 400 for processing/reconditioning a component is shown. The method 400 may be performed as part of an engine maintenance procedure. The method 400 is described below in conjunction with the nozzle(s) shown in FIGS. 3A-3D for ease in description and illustration. One will appreciate that the method 400 may be adapted to accommodate other components (e.g., other nozzles). While the nozzles 300a-300d are described below as being separate nozzles (e.g., are shown with distinct reference characters in FIGS. 3A-3D), one will appreciate that they may represent the same nozzle at different points/steps of processing/conditioning in accordance with the execution of the method 400.

In block 406, a location of one or more holes, such as for example the holes 316a and 316b, may be identified. As part of block 406, a map/specification of a location of a hole may be consulted. The map/specification may be established during the original manufacture of the nozzle 300a and may be particular to the specific instance of the nozzle 300a. For example, the location of a hole may be specified with respect to a serial number (or other part tracking identifier) of the nozzle 300a. In some embodiments, the location of a hole may be specified on the basis of a make/model number of the nozzle 300a. The location of a hole may be based on an identification of one or more other features of the nozzle 300a, such as for example an external edge/surface of the nozzle 300a. In some embodiments, a location of a hole may be determined based on one or more scans incorporating one or more sensors as would be known to one of skill in the art. U.S. Pat. No. 7,329,832 provides examples of such scanning; the contents of this U.S. Pat. No. 7,329,832 patent are incorporated herein by way of reference.

In block 412, one or more coatings 310 may be removed from the substrate 304. For example, a toolset 340 may be applied to the nozzle 300a (e.g., the coating 310) of FIG. 3A to generate a substrate 304/nozzle 300b (see FIG. 3B) that is substantially coat-free. For example, in comparing FIG. 3A to FIG. 3B, the nozzle 300b is substantially similar to the nozzle 300a but does not include the coating 310. The toolset 340 may be operative on the basis of one or more techniques, such as for example use of a water-jet, sandblasting, etc. The toolset 340 may be operated manually. The toolset may be operated on at least a partially automated basis. To the extent that the toolset 340 is automated, the toolset 340 may include a system similar to the system 500 described below in conjunction with FIG. 5.

In block 418, the substrate 304/nozzle 300b of FIG. 3B may be (re)coated to include a coating 310' in forming a nozzle 300c (see FIG. 3C). A thickness 'T' of the coating 310' may be substantially equal to a thickness 'T' of the coating 310. In other words, the coating performed in block 418 may substantially restore the coating 310' on the substrate 304 to the (original) thickness of the coating 310. As shown in FIG. 3C, a portion of the coating 310' in proximity to the hole 316a (as reflected by the portion inside the circle 322) may at least partially or completely block the hole 316a. The wavy lines contained within the circle 322 represent/reflect the (re)coating applied in block 418; at least a portion of the (re)coating may adhere to the sidewalls of the substrate 304 at the location of the hole 316a thereby blocking the hole 316a. As used herein, a blocking of the hole 316a includes at least a partial or complete obstruction of the hole 316a that precludes a flow of a fluid (e.g., air) through both the substrate 304 and the coating 310'.

In block 424, the flow interfering portion 322 of the coating 310' may be removed to generate a hole 316b' through the coating 310'. For example, in comparing FIG. 3C to FIG. 3D, in FIG. 3D a nozzle 300d may be formed via the removal of the flow interfering portion 322 of the coating 310'. The removal of the flow interfering portion 322 may be facilitated by application of a toolset 350 to the flow interfering portion 322 as shown in FIG. 3C. The holes 316a and 316b' may be arranged about the axis 'A' in a manner similar to the arrangement of the holes 316a and 316b about the axis 'A' shown in FIG. 3A.

In some embodiments the toolset 350 may correspond to the toolset 340 shown in FIG. 3A. In some embodiments, the toolset 350 may include a laser 360 that may be used to remove the flow interfering portion 322.

Concurrent with or following the removal of the flow interfering portion 322 in block 424, a counterbore may be formed in the coating 310', the counterbore coinciding with the hole 316b'. For example, and referring to FIG. 3D, the depth/thickness of the counterbore may be substantially equal to the thickness 'T' of the coating 310'. A dimension of the counterbore (illustratively shown in FIG. 3D as a width 'W' being measured at the interface between the substrate 304 and the coating 310' from an edge 328 of the substrate 304 where the substrate 304 and the hole 316a meet) may have a value within a range of 50-100% of a dimension (e.g., a (mean) diameter 'D') of the hole 316a. The substrate 304 may be free of coating in a region of the substrate 304 that is proximate the hole 316a and adjacent to the edge 328 over a span coinciding with the width 'W'. Stated slightly differently, a clearance may be established from the edge 328 of the substrate 304 to the coating 310' equal to the value of the width 'W'. While specified in terms of width 'W', other dimensions (e.g., a diameter) of the counterbore may be specified to reflect/represent an enlargement in the coating 310' relative to a dimension (e.g., the diameter 'D') of the hole 316a.

In some embodiments, the width 'W' may be uniform/symmetrical about the hole 316a. In some embodiments, the width 'W' may be non-uniform/asymmetrical about the hole 316a; for example, multiple values for the width 'W' may be used in a given embodiment.

The inclusion of the counterbore in the coating 310' may be provided to account for component and/or process tolerances. For example, the counterbore may be provided to account for differences in a location of the hole 316a on a first instance of the nozzle 300a relative to a location of that same counterpart hole 316a on a second instance of the nozzle 300a. The particular value for a dimension (e.g., width 'W') that is used in a given application may be determined based on a size that is considered to be acceptable to the function/purpose of the coating 310' in the first instance. For example, one or more thresholds may be established based on a thermal conductivity or thermal loss associated with the substrate 304 and/or the coating 310/310'.

In terms of the application of the toolset 350 (e.g., the laser 360) to establish the hole 316b' through the coating 310' as described above in block 424, the technique that is applied may leave the substrate 304 substantially undisturbed. In this respect, one or more of the parameters of the toolset 350 may be controlled/regulated so as to only remove the flow interfering portion 322 of the coating 310'. For example, parameters of the laser 360 that may be regulated include: the total number of laser pulses during drilling, laser power, pulse width, or spot size (potentially as a function of a given power).

Blocks of the method 400 may execute in an order or sequence that is different from what is shown in FIG. 4. For example, in some embodiments block 412 may execute prior to block 406, as doing so may provide a greater ability to identify the hole(s) 316a in the first instance without the obstruction presented by, e.g., the coating(s) 310. One or more of the blocks (or one or more portions thereof) of the method 400 may be optional in some embodiments. In some embodiments, additional blocks not shown in FIG. 4 may be included.

Figure 6:
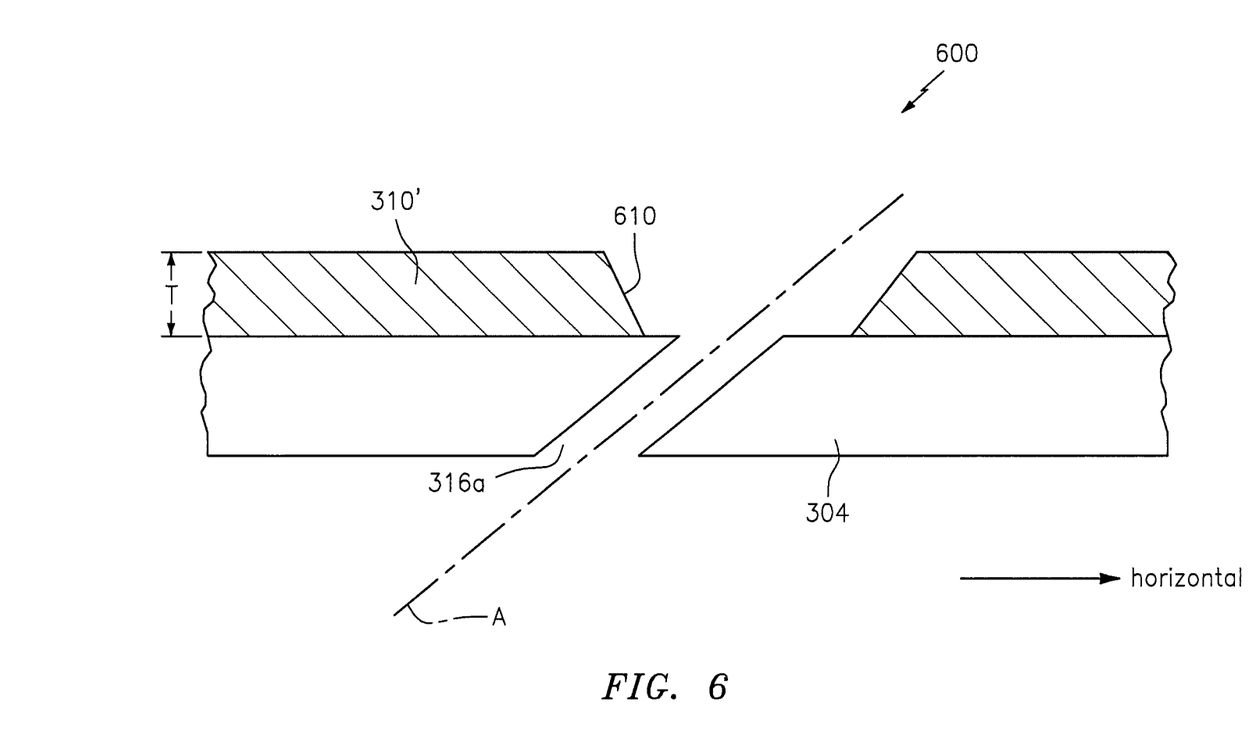
FIG. 6 illustrates a nozzle including a tapered sidewall formed in a coating in accordance with aspects of this disclosure.

The formation of a counterbore in the coating 310' is merely one example of a type of hole/bore that may be created concurrent with or following the removal of the flow interfering portion 322. For example, and referring to FIG. 6, another exemplary embodiment of a nozzle 600 following a removal of the flow interfering portion 322 is shown. In particular, as shown in FIG. 6, a hole/bore may be formed, wherein the hole/bore includes a tapered sidewall 610.

Figure 7:
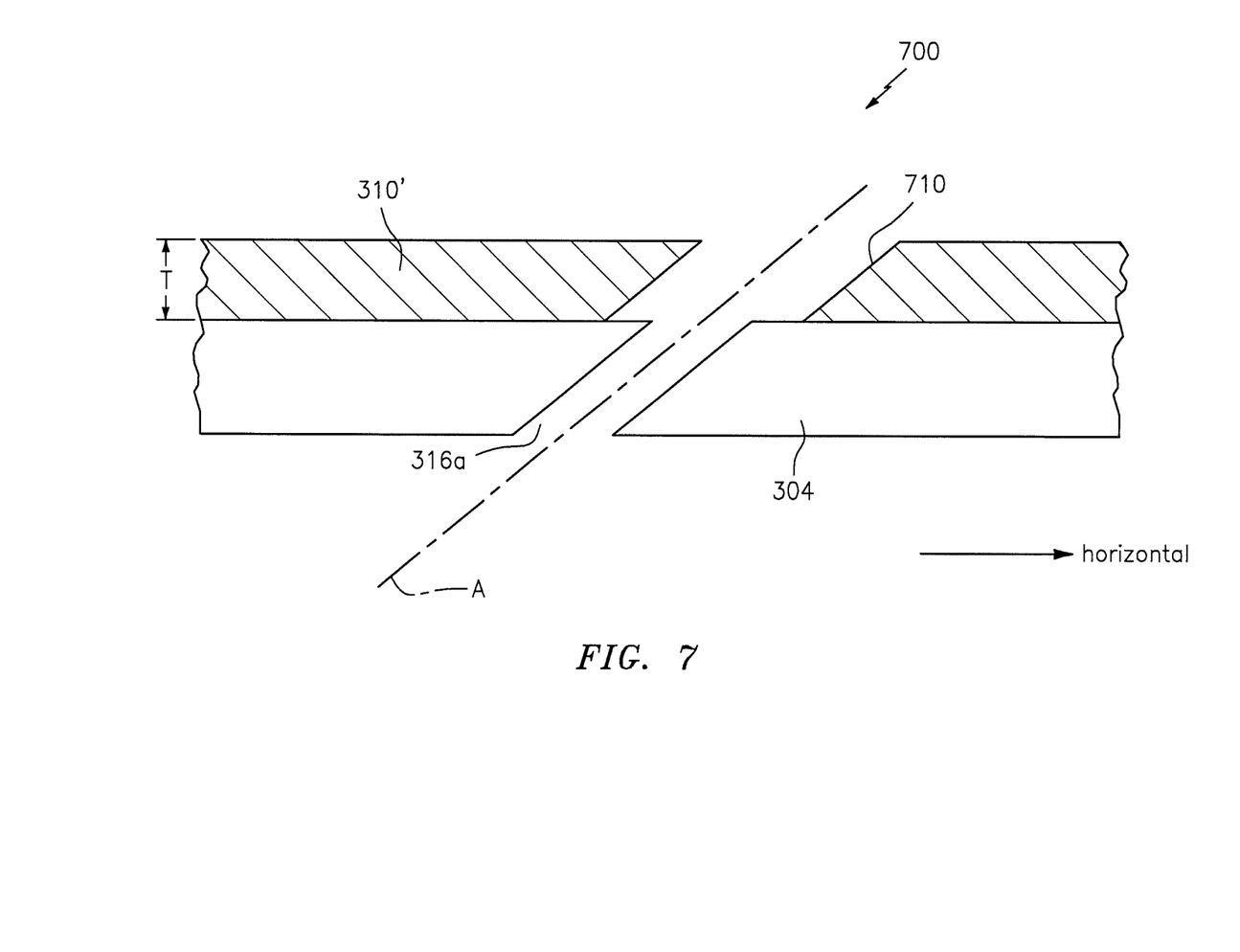
FIG. 7 illustrates a nozzle including a sidewall that is parallel to an axis of a hole formed in a substrate.

FIG. 7 illustrates yet another exemplary embodiment of a nozzle 700 following a removal of the flow interfering portion 322. In particular, a sidewall 710 may be formed in the coating 310' that may be substantially parallel to the axis A, such that a counterbore is included as part of the nozzle 700.

Other shapes/form factors may be used for the bore. The bore may be larger in dimension than the dimension(s) of the hole 316a.

Figure 5:
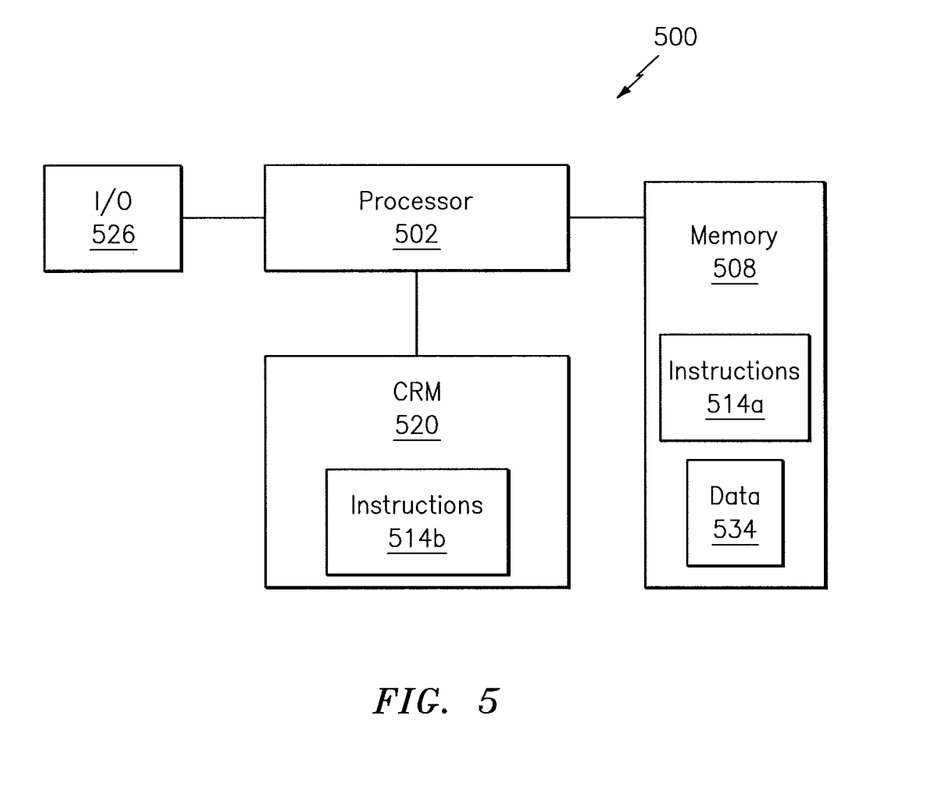
FIG. 5 illustrates a computing system in accordance with aspects of this disclosure.

Turning to FIG. 5, a computing system 500 that may be used in some embodiments is shown. The system 500 may be used to perform one or more portions of the method 400 of FIG. 4 described above. At least a part of the system 500 may be included in the toolset 350 of FIG. 3C. For example, the system 500 may be used to control/regulate operation of the laser 360 in some embodiments.

The system 500 may include a processor 502 and a memory 508. The memory 508 may store instructions (e.g., instructions 514a) that, when executed by the processor 502, may cause the system 500 to perform one or more methodological acts, such as one or more of the acts described herein. At least a portion of the instructions (e.g., instructions 514b) may be stored on a computer-readable medium (CRM) 520, such as for example a non-transitory CRM. The instructions 514b of the CRM 520 may be used as an alternative to, or in addition to, the use of the instructions 514a of the memory 508. One or both of the memory 508 and the CRM 520, taken individually or collectively, may be referred to as a storage device. Much like the CRM 520, the storage device may be non-transitory in nature.

In some embodiments, the system 500 may include one or more input/output (I/O) devices 526. The I/O devices 526 may provide an interface between the system 500 and one or more other components or devices. The I/O devices 526 may include one or more of a graphical user interface (GUI), a display screen, a touchscreen, a keyboard, a mouse, a joystick, a pushbutton, a microphone, a speaker, a transceiver, a laser, a drill, etc. The I/O devices 526 may be used to output data in one or more formats (e.g., a visual or audio rendering).

The memory 508 may store data 534. The data 534 may include an identification of one or more of: a type, material, or thickness of coating that is used (see, e.g., FIG. 3A—coating 310; FIG. 3C—coating 310'), a type or material of a substrate that is used (see, e.g., FIG. 3A—substrate 304), a location of one or more holes (see, e.g., FIG. 3A—hole 316a), a type of laser that is used (see, e.g., FIG. 3C—laser 360), or an identification of the specific laser 360 that is used. An identification of the specific laser 360 that is used may allow for a removal of the flow interfering portion 322 of the coating 310' to take into account variations between different instances of the laser 360 (e.g., variations in parameters associated with the laser 360). Portions of the data 534 may be remotely located and accessible to the system 500 via an extranet or the internet of things.

The system 500 is illustrative. One skilled in the art will appreciate, based on a review of this disclosure, that the implementation of the system 500 may be achieved via the use of hardware, software, firmware, or any combination thereof.

While some of the embodiments described herein specifically related to a nozzle, aspects of the disclosure may be applied to other types of components (e.g., other components of an engine). For example, aspects of the disclosure may be applied to vanes, blades, flaps, cases, liners, etc.

Aspects of the disclosure may be used to remove/clear an obstruction from one or more cooling holes. Such an obstruction may include, for example, a coating that is applied during a recoating procedure. The cooling holes may be cleared without having an appreciable impact to a substrate of a component. In this respect, a cooling hole size and orientation may be controlled/regulated to conform to a particular specification. This may be contrasted with conventional techniques/procedures that would frequently result in one or more of: duplicate sets of holes, enlarged holes, "snowmen" (e.g., a blending of two or more holes, such as for example a first hole included as part of an original manufacture of a component and a second hole that is added during a processing/conditioning of the component), a re-melt of the coating and/or the substrate, and (laser) strikes upon walls/surfaces of the substrate.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A method for processing a component, comprising:
removing a first coating from an outer surface of a substrate of the component, the substrate comprising an inner surface, the outer surface, and a first hole extending from the inner surface to the outer surface, an edge of the first hole defined where the first hole interfaces with the outer surface of the substrate;
subsequent to removing the first coating from the outer surface of the substrate, applying a second coating to the outer surface of the substrate, wherein a portion of the second coating at least partially blocks the first hole; and subsequent to applying the second coating to the substrate, removing the portion of the second coating to generate a second hole through the second coating, wherein the removal of the portion of the second coating creates a bore in the second coating that provides a clearance of the second coating, the bore defined by a sidewall of the second coating, the sidewall comprising a sidewall surface extending from an inner side of the second coating in contact with the outer surface of the substrate to an outer side of the second coating which faces away from the substrate, the sidewall surface surrounding the first hole and spaced from the first hole by a width of the bore extending along the outer surface of the substrate from the edge of the first hole to the sidewall surface of the sidewall of the second coating to define the clearance such that the outer surface of the substrate is free of the second coating within the bore over a span of the clearance coinciding with the width; and
wherein the clearance extends around an entire perimeter of the edge of the first hole.

2. The method of claim 1, wherein the bore has a depth and the second coating has a thickness.

3. The method of claim 2, wherein the depth is equal to the thickness.

4. The method of claim 1, wherein the first hole has a first dimension, and wherein the bore has a second dimension.

5. The method of claim 4, wherein the second dimension is a value within a range of 50-100% of the first dimension.

6. The method of claim 5, wherein the first dimension is a diameter of the first hole, and wherein the second dimension is the width of the bore.

7. The method of claim 1, further comprising: identifying a location of the first hole.

8. The method of claim 7, wherein the location of the first hole is identified subsequent to the removal of the first coating from the substrate and prior to the application of the second coating to the substrate.

9. The method of claim 1, further comprising:
using a laser to remove the portion of the second coating from the substrate.

10. The method of claim 9, further comprising:
controlling, during the removing, at least one parameter of the laser based on an identification of the laser.

11. The method of claim 10, wherein the at least one parameter includes at least one of: a total number of laser pulses, laser power, pulse width, or spot size.

12. The method of claim 1, wherein the first coating is removed from the substrate using a water-jet.

13. The method of claim 1, wherein the bore is a counterbore.

14. The method of claim 6, wherein the bore has a second diameter which is greater than the diameter of the first hole.

15. The method of claim 1, wherein the sidewall surface extends parallel to a center axis of the first hole from the inner side of the second coating and the outer side of the second coating.

16. The method of claim 1, wherein the sidewall surface faces a center axis of the first hole and the sidewall surface extends away from the outer surface of the substrate in a direction from the inner side of the second coating to the outer side of the second coating.

17. The method of claim 1, wherein the width is asymmetrical about the hole.

18. The method of claim 1, wherein the sidewall is a tapered sidewall.

* * * * *